3,623,887
FLOUR MIXES AND BAKED PRODUCTS CONTAINING FATTY ALCOHOL-ENHANCED EMULSIFICATION MIXTURES
Bruce D. Buddemeyer, Kansas City, Mo., Melvin S. Fish, Bethesda, Md., and David Philip Leonard, Overland Park, and Hubert H. Miers, Shawnee Mission, Kans., assignors to The Paniplus Company, Kansas City, Mo.
No Drawing. Filed Apr. 3, 1968, Ser. No. 718,380
Int. Cl. A21d 2/16
U.S. Cl. 99—91
21 Claims

ABSTRACT OF THE DISCLOSURE

There are disclosed flour mixes for preparing baked flour products wherein the quality of the resulting baked product is enhanced by an emulsification composition consisting of a mixture of at least one fatty alcohol having from about 12 to 24 carbon atoms and one or more of three different types of aliphatic ester constituents which are (a) an acyl lactylic acid type ester; (b) a fatty alcohol mono-ester of an aliphatic dicarboxylic acid; (c) an ester constituent (i) of a mono- to di-fatty acid ester of an aliphatic alcohol, (ii) a polyoxyalkalene derivative of these type (i) esters, or (iii) any of the succinylated, lactylated or acetylated derivatives of the type (i) esters; and (d) mixtures of any of these three different types of ester constituents; and with the fatty alcohol being present in the emulsification composition to the extent of from about 1% of to about equal to the weight of the ester constituent.

---

This invention is that of certain fatty alcohol-enhanced emulsification mixtures which are more effective, for example, in food products, especially baked carbohydrate food products, cosmetic, and pharmaceutical preparations than their individual ingredients. More particularly the invention is that of emulsification mixtures containing one or more of any of certain three different types of emulsifying esters (more fully described below) enhanced by admixture therein of a very small amount of a monohydric fatty alcohol having about 12 to about 24 carbons and as further described below.

A unique feature of the invention is its provision of emulsification mixtures of any of these referred to fatty alcohols with at least one of any of these three certain types of emulsification esters, which mixtures show enhanced effectiveness over that of an equivalent amount of any of their individual constituents.

Another feature of this invention is its provision of these fatty alcohol-enhanced ester-containing emulsification mixtures which, for example, when incorporated in the doughs for bakery products particularly for baked leavened dough products, considerably improve one or more of their various physical properties and quality above what could be expected from the addition of the respective amounts of the individual ingredients.

A further feature of this invention is the provision of hydrated (as later herein defined) as well as non-hydrated compositions such as shortening containing these fatty alcohol-enhanced emulsification mixtures.

Yet another feature of this invention is the provision of improved mixtures of emulsification agents which, when included as ingredients in icings, candy fillings, fondants, creams, and the like, significantly improve their properties and usefulness.

Other features of the invention will be recognized from the following more detailed description of it.

The enhanced emulsifying mixtures of the invention comprise a mixture of (1) a fatty alcohol constituent having from about 12 to about 24 carbons; and (2) one or more of any of the ester compounds (a) an acyl lactylic acid and/or any of its physiologically tolerable salts; (b) a fatty alcohol mono-ester of an aliphatic dicarboxylic acid and/or any of its physiologically tolerable salts; and (c) certain polyol esters of straight or branched chain, saturated or unsaturated fatty acids having from about 12 to about 24 carbons, or mixtures of these esters which as to their starting polyol and acyl materials are more fully described shortly below.

The fatty alcohol constituent of the enhanced emulsification mixtures of the invention is a straight or branched chain, otherwise unsubstituted, saturated or unsaturated monohydric aliphatic alcohol having from 12 to 24 carbon atoms and no oxygen other than that of its hydroxyl radical. The applicable fatty alcohols include, for example, among others, lauryl, myristyl, cetyl, stearyl, eicocyl, docosyl (i.e. behenyl), oleyl, isooleyl, linoleyl, and erucyl alcohols, among others, as well as mixtures of any of them. The more effective fatty alcohols for these mixed addition agent compositions are those having from about 12 to about 20 carbon atoms and not more than one olefinic bond.

The acyl lactylic acids and their salts which are type (a) of the three types of ester substances which can be embraced in the second constituent of the mixed addition agent compositions of the invention have the formula $RCO \cdot (OCHCH_3CO)_n OZ$, wherein RCO is the acyl radical of one or more of the straight or branched chain, saturated or unsaturated fatty acids having from about 16 to about 24 carbons, and Z is a cation which is physiologically tolerable in its regimen of use, and $n$ is the average number of lactyl groups, that is to say, having the formula $(OCHCH_3CO)$, present in the molecule of the acyl lactylic acid. The value of $n$ is from about 0.1 to about 10.0, and the more effective acyl lactylic acids are those wherein $n$ is from about 0.3 to about 6.0. The cation Z is hydrogen, when the acyl lactylic acid is in the acid form, or other cation which is physiologically tolerable in its regimen of use such as an alkali metal as sodium, potassium, or the ammonium group, or an alkaline earth metal as calcium or magnesium, or an essential trace metal such as aluminum, copper, iron, cobalt, manganese and zinc, all when the acyl lactylic acid is in salt form. The generally more effective acyl lactylates so far as presently observed are those of the alkali metals sodium and potassium, and of the alkaline earth metals calcium and magnesium which latter is included with alkaline earths.

The fatty alcohol mono-esters of aliphatic dicarboxylic acids and/or salts thereof, which are the type (b) of the three types of ester substances which can be embraced in the second constituent are the mono-esters obtained from the esterification of any of the foregoing fatty alcohols having 12 to 24 carbon atoms, or mixtures of them, with an aliphatic dicarboxylic acid having up to and including 10 carbons, or its corresponding acyl halides or anhydrides. Useful as such dicarboxylic acid are succinic, glutaric, adipic, fumaric, malic, azelaic, and sebacic acid, or mixtures of any of them, or the anhydrides of any of them, or their acyl halides (e.g., bromides, chlorides, iodides, fluorides of any of the foregoing acids), or mixtures of any of the foregoing anhydrides or acyl halides.

The emulsification compositions of the invention thus include at least one fatty alcohol of the type hereinabove described admixed with a fatty alcohol mono-ester of an aliphatic dicarboxylic acid having the formula $$R'OOCR''OOZ$$

wherein R' is the monovalent hydrocarbon radical of a fatty alcohol having from about 12 to about 20 carbon atoms and at most only one olefinic bond.

The polyol esters of fatty acids which are the type (c) of the three different types of ester substances which the second or ester constituent of the emulsification mixtures of the invention can embrace are mono- and/or di-fatty acid esters of aliphatic polyhydric alcohols or derivatives, e.g., polyoxyalkylene derivatives, of them. These mono- and/or di-fatty acid esters of aliphatic polyhydric alcohols are esterification products of fatty acyl compounds (e.g., acids or acyl halides) having from about 12 to about 24 carbons or mixtures thereof, with aliphatic polyhydric alcohols or the indicated derivatives of them, having from 2 to about 6 hydroxyl groups linked to the aliphatic chain. The more effective polyhydric alcohols are those having fewer than about 12 carbons in the aliphatic chain.

Examples of the polyhydric alcohols include the dihydric alcohols such as ethylene glycol, propylene glycol, butylene glycol, isobutylene glycol, hexylene glycol, and the like, the trihydric alcohols such as glycerol, 2-methyl-1,2,3-propanetriol, 1,2,3-butanetriol, 1,2,4-butanetriol and 1,2,6-hexanetriol; and aliphatic higher polyols such as sorbitol and mannitol.

More effective among the examples of the mono- and di-fatty acid esters of these aliphatic polyhydric alcohols, so far as presently observed, are the mono-fatty acid (that is, having from about 12 to about 24 carbons) esters of glycerol, commonly called the mono-glycerides which, as is known, generally include varying residual minor amounts of di- and tri-glycerides, such as glyceryl monostearate, glyceryl monopalmitate; or other related esters as propylene glycol monostearate, glyceryl lactopalmitate, and glyceryl lactostearate; succinylated glyceryl monostearate, and acetylated tartaric acid ester of mono- and di-glycerides, sorbitan monostearate; polyoxyethylene($n$) glyceryl monostearate and polyoxyethylene($n$) sorbitan monostearate or monopalmitate, in either of which $n$ can be from 5 to 100 and advantageously at least up to 20; including mixtures of any of these various esters.

The addition alone of any of the above-described fatty alcohols, constituting the first required ingredient or part (1) of the enhanced emulsification mixture compositions of this invention, has been found to improve some one of the physical characteristics and quality of yeast-raised bakery products when used at levels ranging from 0.05 to about 5.0 percent, based on flour weight (as in U.S. Pat. No. 2,657,143).

Also, each of the foregoing agents (2)(a), (b), or (c), any one or more of which can be embraced as the second of the required constituents of the compositions of the invention, when employed singly, is functional so that its use results in an improvement in some one or more of the quality, softness and other physical characteristics of the baked product.

For example, the addition of acyl lactylic acids or their salts, described above as one, namely (a), of the three types of ester substances which could be part of ingredient (2) of the compositions of this invention, to the dough for yeast- and to chemically-leavened baked goods has been found to improve some one or more of their physical properties and quality (as in U.S. Pats. Nos. 2,744,825; 2,744,826; 2,973,270; and 3,146,110).

The addition of fatty alcohol mono-esters of aliphatic dicarboxylic acids and/or their salts alone, to the dough for yeast- and to chemically-leavened baked goods, also has been shown to improve some one or more of the physical characteristics or quality of these goods (as in pending U.S. patent application Ser. No. 638,724 now Pat. No. 3,360,375).

The addition of certain polyol esters of fatty acids, the substances described above as type (c) of the three types of ester substances which could be part of the second required ingredient of the composition of this invention, to their respective doughs are known to improve some one or more of the physical characteristics and quality of the resulting yeast- and chemically-leavened baked goods.

In addition, some combinations of ester substances which can be used as, or as a component of, the second required ingredient or part (2) of the emulsification mixtures of this invention are known to improve one or more of the physical characteristics and the quality of yeast- and chemically-leavened baked products when included as additives to the doughs used for making these baked products (as in U.S. Pat. No. 3,228,772; U.S. patent application Ser. No. 647,877; and Canadian Pat. No. 561,704).

The fatty alcohol-enhanced emulsification composition of this invention are a unique group of mixtures of (1) the earlier above described alcohols as one required ingredient together with (2) a second required ingredient which is any one or more of any of the (a) acyl lactylic acids and/or salts of any of them, (b) fatty alcohol monoesters of aliphatic dicarboxylic acids and/or salts of any of them, and (c) certain polyol esters of fatty acids, each of (a), (b) and (c) are respectively more fully described above.

According to this invention, it was found that when a very small quantity, say, from about 0.01 to 0.05 baker's percent (that is, based on the flour weight and thus exclusive of water) of any of the particular fatty alcohols (earlier above described as the first required ingredient of the fatty alcohol-enhanced emulsification mixtures), is admixed with, say, from about 0.15 to about 0.75 baker's percent, of one or more of any of the three different types (a), (b) and (c), as described earlier above, of the ester substances constituting the second required ingredient, and as such resulting mixture incorporated in the indicated relative baker's percentages in the dough for yeast-leavened baked products, unexpected advantages and improvement occur in one or more of the physical characteristics and quality of the resulting yeast-leavened baked products beyond that expected from the mere additive result of the respective quantities used of the fatty alcohol ingredient and the ester ingredient. Such results indicate that there is an apparent synergistic effect from the joint use of the admixed fatty alcohol and ester ingredients.

Such unexpected result is indicated when the mixture of the fatty alcohol and the ester substance ingredient is used in about the same amount or less than that in which the ester substance alone would have been used without the fatty alcohol.

The emulsification mixture of the invention, containing the fatty alcohol ingredient and one or more of the ester substances as its second required ingredient, can be used in the ratio of from 1 part of the fatty alcohol to from 1 to about 100 parts of the ester substance ingredient, and more effectively from about 2 to about 4 parts of the fatty alcohol to from about 25 to about 75 parts of the ester ingredient, for example, to improve one or more of the physical characteristics and quality of, say, carbohydrate comestibles, such as baked flour products, by adding the fatty alcohol-enhanced emulsification mixture to the constituents for the baked goods in several different ways other than by premixing with either hydrated or non-hydrated compositions, or hydrated or non-hydrated shortening compositions. Thus, methods of incorporating the emulsification mixtures of this invention into the constituents used for the baked products include, but are not limited to, the following:

(A) The fatty alcohol ingredient or required part (1) and the one or more of the ester substances of part (2) of the fatty alcohol enhanced emulsification composition may be premixed, without shortening, and added dry to, for admixing with, the usual ingredients for making the leavened baked goods.

(B) The fatty alcohol ingredient required as part (1) and any of the ester substances of part (2) of these emulsification mixtures of the invention can be added separately and dry, without premixing with shortening, to the usual ingredients for making the leavened baked goods.

(C) The fatty alcohol as part (1) for the emulsification mixture and the ester substance of part (2) of this mixture of the invention can be premixed in a hydrated form before addition, and then thus added, to the ingredients which are used for the preparation of the baked products. This ordinarily is a desirably effective method.

(D) The fatty alcohol to serve as part (1) of the emulsification mixture and the ester substance of part (2) of this mixture of the invention can be incorporated with the ingredients for making either the sponge or the dough of bread prepared by the sponge-dough procedure.

(E) The fatty alcohol to be part (1), and the ester substance of part (2)(b) for the mixture can be combined to provide the enhanced emulsification mixture by so adjusting the procedure for preparing the ester substance to serve as part (2)(b) in such a manner that the required amount of the fatty alcohol comprising part (1) of this emulsification mixture is employed in the form of an excess over its amount required as the esterifying agent, prior to initiating the reaction to produce the ester substance to serve as part (2)(b) of this fatty alcohol-enhanced emulsification mixture.

By careful control of this esterification reaction, the reaction process will reach its completion, thereby to provide a final composition which contains the appropriate proportions of the required substances to constitute the respective component parts (1) and (2)(b) of the fatty alcohol-enhanced emulsification mixture composition of this invention. The composition which results from such reaction then can be employed directly for incorporation in the ingredients for the final baked product in any of the several ways described above.

The examples which follow illustrate, but do not limit, the unexpected functionality of the fatty alcohol-enhanced emulsification compositions of this invention as used in food products, for example, carbohydrate food products such as bakery products as breads; for other types of combinations of the respective ingredients of those mixture composition then can be prepared by those skilled in this art from the overall description of them as demonstrated by these examples.

PREPARATION OF EXPERIMENTAL BREAD LOAVES FOR EVALUATION WITH ADDED EMULSIFICATION AGENTS

A (commercial) white bread recipe or formula and commercial baking procedure used in preparing experimental loaves of bread to be evaluated are described just below, for example, by use of a customary sponge and dough procedure, with the following ingredients at their respectively enumerated percent levels.

These percent values are expressed in the usually termed "baker's percentage" which is based on the total flour weight contained in the formula being considered as 100%. This unit then implies that the parts by weight of an ingredient is expressed as relative to the total flour as 100 parts. In the laboratory bake shop, a dough containing 800 gms. of flour usually is produced.

| Ingredients | Baker's percent | Weight (gms.) |
|---|---|---|
| Flour (14% M.B.*) | 100.00 | 800 |
| Salt | 2.25 | 18 |
| Sucrose | 4.00 | ₃₂ |
| Corn sugar | 5.00 | 40 |
| Lard | 3.00 | 44 |
| Nonfat dry milk | 3.50 | 28 |
| Yeast | 3.00 | 44 |
| "Arkady" yeast food | 0.50 | 4 |
| Water (varies with flour) | 60-67 | 480-536 |

*M.B. means moisture basis.

The sponge was prepared from 65% (baker's) of the total bread flour, all of the yeast and "Arkady" yeast food (containing potassium bromate and iodate, ammonium chloride, and ammonium and calcium sulfates), and 41.6% water based on the total flour weight The yeast was dispersed in a portion of the sponge water prior to the addition to the flour. These ingredients were mixed in a Hobart mixer (Model A-120) fitted with a water-jacketed McDuffy bowl and fork. A sponge temperature of 80° F. was maintained by adjusting the cold water supply to the insulated jacket surrounding the mixing bowl.

The components of the sponge were mixed in the McDuffy bowl (flat-bottomed, depending arms stirrer) for one-half minute at low speed (48 r.p.m.) and then four minutes at second speed (88 r.p.m.). The resultant sponge then was transferred to a tinned metal trough and fermented for four hours in a (National Manufacturing Company) fermentation cabinet; constant temperature and humidity were maintained as measured by a hygrometer at 90% relative humidity with a dry bulb temperature of 82° F.

The sponge subsequently was remixed with the remaining portion of the formula. The dough ingredients consisted of 35% of the total flour, 3.50% milk, 2.25% salt, 5.0% corn sugar, 4.0% granulated sucrose, 3.0% lard, and the remaining water. The dough was mixed at low speed (48 r.p.m.) for one-half minute and usually about eight minutes at second speed (88 r.p.m.) in the Hobart A-120 mixer. The mixing time is dependent upon the physical characteristics of the particular flour employed. The dough temperature was regulated for it to come from the mixer at 81° F., by means of the temperature-controlled jacket surrounding the mixing bowl and by controlling the temperature of the dough water.

The dough then was placed in the fermentation cabinet for forty minutes under the above same temperature and relative humidity cited above. Following this fermentation period, or floor time, two 482-gram dough pieces were scaled. The scaled dough pieces were passed twice through a dough sheeter, first with a roll clearance of $5/16$ inch and then a second time at a clearance of $7/32$ inch. The pieces, covered with a polyethylene sheet to minimize moisture loss, then were given a ten-minute recovery time at room temperature on the bench. This part of the procedure corresponds to an overhead proofer in a commercial bake shop.

Following the ten-minute recovery period, the doughs were moulded through a Stickelber cross-grain moulder with roller settings of $3/8$ inch on the top roller and $5/64$ to $3/32$ inch on the bottom roller. The moulded dough pieces were panned, numbered and placed in a "Humi-Tem" proof box and allowed to rise at 110° F. (dry bulb) and 106° F. (wet bulb) until the top surface of the center of the dough is $3/4$ inch above the top of the pan. The entire proofing process averages approximately one hour The 482-gram dough pieces scaled into the bread pans utilized have a pan factor of 2.48. The pan factor represents the number of square inches of top pan surface per ounce of dough. The bread pans employed have the following dimensions:

Top—4½ in. x 10 in.,
Bottom—3⅞ in. x 9½ in.,
Depth—3¼ in.

When the dough had risen to the desired height, it was baked for twenty-one minutes in a four-tray Reed reel oven at a temperature of 415° F. From the oven, the bread was placed on a wire cooling rack for 70 minutes. Uniform cooling was accomplished by spacing the test loaves approximately 2 inches apart on the wire rack. The loaves then were packaged in air-tight polyethylene bags until evaluation was to be made. Room temperature was not precisely controlled. This was reflected in slight differences in compressibility within duplicate loaves from day to day. Control loaves were baked daily and used for reference.

Following a storage period of 24 hours, volumes were taken with a volumemeter using the rape seed displacement method, and bread quality was scored according to a modification of the method used by the American Institute of Baking. This is a numerical summary of the internal and external quality factors which have been carefully rated as to their relative importance, and presented as follows:

[Total external and internal=100.0]

| External | | Internal | |
|---|---|---|---|
| Volume | 10 | Grain | 19 |
| Crust color | 3 | Crumb color | 12 |
| Symmetry | 3 | Aroma | 10 |
| Evenness of bake | 3 | Taste | 10 |
| Crust character | 3 | Chewability | 12 |
| Break and shred | 3 | Texture | 12 |
| Total | 25 | Total | 75 |

Crumb compressibility usually is measured after storage of the loaves in the air-tight polyethylene containers at room temperature for 24 and 48 hours. The loaves of bread are sliced with a "Junior Slicemaster" (manufactured by the Micro Corporation, Bittendorf, Iowa). The center 12 slices are used in sets of four slices each, measuring 2¼ inches, giving three readings per loaf.

A "Precision" penetrometer fitted with a cylindrical plunger 3 cms. in diameter and weighing 265 gms. was employed to measure compressibility. The 3-cm. plunger disc was placed in the center of each group of four slices and allowed to compress the bread crumb for a period of 10 seconds. At the end of that time, movement of the plunger was arrested and the depth of penetration measured by means of a dial micrometer calibrated in 0.1 millimeter. An average of six compression values generally is considered a valid measure of crumb compressibility.

Products of the invention, and their use, are illustrated by, but not restricted to, the following examples:

EXAMPLE 1.—MIXTURES OF ANY INDIVIDUAL FATTY ALCOHOL WITH SODIUM STEARYL FUMARATE

A dry mix was prepared by admixing 9 parts of finely divided sodium stearyl fumarate as the ester constituent with one part of finely divided myristyl alcohol, thereby to provide an example of a dry mix of an ingredient (1) with an ester ingredient (2)(a) of this invention.

Other such dry mixes of the fatty alcohol ingredient (1) with that ester ingredient (2)(a) were prepared by admixing similarly 9 parts of the sodium stearyl fumarate separately respectively with each of finely divided cetyl alcohol, stearyl alcohol, and eicosyl alcohol, thereby to prepare three separate mixes containing sodium stearyl fumarate as the ester constituent admixed separately respectively with cetyl alcohol in one of them, with stearyl alcohol in the second one of them, and with eicosyl alcohol in the third one of them.

A further mixture was prepared by admixing 9 parts of the finely divided sodium stearyl fumarate with one part of lauryl alcohol (which is liquid).

Other such mixes were prepared correspondingly similarly by admixing 91 parts of finely divided sodium stearyl fumarate separately respectively with 9 parts of finely divided myristyl alcohol, cetyl alcohol, stearyl alcohol, and eicosyl alcohol, and also separately with lauryl alcohol. Thereby there were obtained five different mixtures differing from the earlier five of this example by having a slightly higher content of the ester constituent sodium stearyl fumarate.

Then, using the earlier above described baking procedure separate batches of loaves of white bread were prepared by admixing dry (except when lauryl alcohol is used) into the respective sponge for each separate batch of bread loaves (i) 0.2 (baker's) percent of sodium stearyl fumarate, (ii) 0.5 such percent of sodium stearyl fumarate, (iii) 0.025 such percent of lauryl alcohol, myristyl alcohol, cetyl alcohol, stearyl alcohol, and eicosyl alcohol, each of them separately respectively and (iv) similarly 0.045 percent of each of said five fatty alcohols also separately respectively; and (v) then also 0.25 such percent of a single separate mixture of 0.225 percent of sodium stearyl fumarate with 0.025 percent of each separate one respectively of these five alcohols; and (vi) then similarly 0.50 percent of each of the separate mixtures of 0.455 percent of sodium stearyl fumarate with 0.045 percent of each of these five fatty alcohols separately respectively.

A further such batch of loaves was prepared without any of these additives to serve as a control.

After each of the foregoing 22 separate batches of loaves was finished, they were separately scored by the earlier above described scoring procedure.

The respective scoring results showed that:

The fatty alcohols used alone at either of the two levels at which they were added provided no or very little improvement in the bread score over that of the control breads made without any of these additives.

On the other hand, the breads containing separately respectively 0.25 percent and 0.5 percent of each of the different mixtures of sodium fumarate with a different one of the fatty alcohol constituent showed, for example, marked improvement in the 48-hour compressibility compared with the score for that of the breads wherein sodium stearyl fumarate alone was used at the same two levels. To illustrate, the two separate mixtures of 0.225 percent sodium stearyl fumarate with 0.025 percent of myristyl alcohol and separately with 0.025 percent of cetyl alcohol scored 48-hour compressibilities of 233 and 232 respectively against a score of only 208 for that of the bread using 0.25 percent sodium stearyl fumarate alone (i.e. without any of the fatty alcohols).

The scores on some of the other properties were approximately equivalent, although some of the alcohols, such as eicosyl alcohol, added in an admixture with the sodium stearyl fumarate produced bread superior in most of the scoring properties. In contrast, eicosyl alcohol when added alone provided bread with scores comparable with that of the control bread with no additive, and no improvement was evident even when the level of eicosyl alcohol alone was raised from 0.025 percent to 0.045 percent.

Use of 0.045 percent of stearyl alcohol admixed with 0.455 percent of the sodium stearyl fumarate provided bread with a surprisingly high 48-hour compressibility score and manifested overall quality equal to or greater than that of the bread prepared by use of sodium stearyl fumarate alone.

EXAMPLE 2.—STEARYL ALCOHOL ADMIXED WITH SODIUM STEARYL FUMARATE COMPARED WITH LATTER ALONE

Using the earlier above described baking procedure, three separate batches of breads were prepared, one as a control without any additives, a second with 0.375 (baker's) percent sodium stearyl fumarate, and the third with a mixture of 0.3375 such percent of the sodium stearyl fumarate and 0.0375 percent of stearyl alcohol.

The scores observed by the earlier above scoring procedure showed for the bread made by using the mixture of the stearyl alcohol with the sodium stearyl fumarate a marked improvement in total quality score and in 48-hour as well as 72-hour compressibility scores.

EXAMPLE 3.—COMPARISON OF STEARYL ALCOHOL ALONE AND ITS MIXTURE WITH SODIUM STEARYL FUMARATE AND WITH CALCIUM STEARYL-2-LACTYLATE, AND WITH LATTER ALONE

Using the earlier described baking and scoring procedures, the scores for bread made with stearyl alcohol were compared with those for bread made with mixtures of it with sodium stearyl fumarate and also with calcium stearyl-2-lactylate at various levels and with each of these two ester salts alone at comparable levels.

The breads prepared by use of the mixture of stearyl alcohol with sodium stearyl fumarate showed a good improvement in the 48-hour compressibility score. Those made by using the mixture of stearyl alcohol and calcium stearyl-2-lactylate showed a significant improvement in volume and quality scores compared with bread made by using that lactylate salt alone.

The high compressibility scores usually associated with the use of calcium stearyl-2-lactylate alone were maintained when breads were made by using that lactylate salt admixed with stearyl alcohol. However, at levels where sodium stearyl fumarate and likewise calcium stearyl-2-lactylate normally are not considered to be functional, each of these salts separately can be admixed with a small amount of fatty alcohol applicable in the mixtures of this invention, with the result that a bread volume, crumb compressibility and overall quality score is produced which is comparable to the effect from these salts when used at effective levels.

EXAMPLE 4.—FATTY ALCOHOLS ADMIXED WITH CALCIUM STEARYL-2-LACTYLATE COMPARED WITH LATTER ALONE

Using the earlier above described baking and scoring procedures, each of the fatty alcohols used as ingredient (1) in the mixes used in Example 1, was admixed separately with calcium-stearyl-2-lactylate. Each of these mixtures was used separately in making sponge-dough breads which then were compared with like breads made by using only calcium stearyl-2-lactylate alone as additive at 0.25% (baker's) and 0.5% levels. For each mix used at the 0.25% level, 0.025% (i.e. baker's) of the fatty alcohol was admixed with 0.225% of the calcuim stearyl-2-lactylate; and for the mix at the 0.5% level, 0.045% of the fatty alcohol was admixed with 0.455% of the calcium stearyl-2-lactylate.

At the 0.25% level, all scores, such as volumes and compressibilities of the breads made by use of these respective mixtures of a different one of these fatty alcohols with the calcium stearyl-2-lactylate consistently were at least equal to or better than those manifested by the bread samples made by using that lactylate salt alone.

At the 0.5% level, the differences were not significantly great, but again the breads made by use of a mixture of a fatty alcohol with that lactylate salt showed scores at least equal to or better than those shown by the breads made by the use of that lactylate salt alone. Thus, while use of the mixtures of the alcohol with that lactylate salt did not provoke extraordinarily marked improvement, nevertheless that comparison showed that the use of these mixtures provides an economic advantage to the baker and consumer as well. That is so because of the relatively lower cost of the mixture of the fatty alcohol with that lactylate salt as compared with the cost of that lactylate salt alone.

Moreover, the functionality of the calcium stearyl-2-lactylate as used in bread making is known to drop off rapidly at levels of its use below about 0.3% (i.e. baker's). However, the use of these mixtures of any of these fatty alcohols with the calcium stearyl-2-lactylate within the proportions disclosed herein and at levels of a total of both constituents of from 0.25 to 0.3% appeared to restore most of the functionality which was lost when that lactylate salt was used alone at those lower levels.

EXAMPLE 5—COMMERCIAL CONTINUOUS-MIX BREAD MAKING PROCESS EVALUATION

Two diffeernt fatty alcohol and ester constituent mixtures, one containing stearyl fumaric acid and the other sodium stearyl fumarate, with each containing about 3% of stearyl alcohol by weight of the mixture, were compared by use in a commercial continuous-mix bread making process against the use of sodium stearyl fumarate alone, calcium stearyl-2-lactylate alone, and also against the use alone of a hydrated 55% alpha-monoglyceride additive which at the particular bakery was found to be particularly functional.

Each of the latter three additives were used separately alone at a level of 0.5 percent (baker's) because prior studies at that bakery had shown that functionality could not be obtained with any one of them alone at levels as low as 0.3%. However, eavh of the two mixtures of stearyl alcohol with stearyl fumaric acid and separately with sodium stearyl fumarate was used at a total level (i.e. of the mixture) of 0.25% (based on flour weight).

The scoring of the different breads baked with respectively separate use of the five different additives (namely, the two separate mixtures containing stearyl alcohol, and each of the other three additives used singly) showed that the initial scores and compressibilities were fairly comparable for the bread samples made with each different one of the five additives except for those obtained by the use of sodium stearyl fumarate alone. These latter samples showed low compressibilities at 24 hours.

However, compressibilities of the various samples taken at 72 hours and at 152 hours respectively, show that use of each of the fatty alcohol and ester component mixtures, namely, (i) stearyl alcohol mixed with searyl fumaric acid and (ii) sodium stearyl fumarate and stearyl alcohol mixture, provided softer or much later staling bread than did the use of sodium stearyl fumarate alone even at the higher level (double that of the level of use of the mixtures). These comparative compressibility scores show that the stearyl alcohol and ester component mixtures used at the lower 0.25% level were at least equivalent to and apparently better than the singly used commercial additives included at the higher 0.5% level.

The most outstanding differences, however, were the significantly better total quality scores of 90.9 shown by bread obtained by using each of the stearyl alcohol and ester component mixtures as against 90.0 shown by the use of the sodium stearyl fumarate alone, 90.1 by use of the calcium stearyl-2-lactylate alone, and 88.8 by use of that hydrated 55% alpha-monoglyceride alone.

In addition to providing improvement in yeast-leavened bread, the fatty alcohol and ester component mixtures of the invention have been used successfully in other chemically-leavened baked goods. Thus, admixture of a fatty alcohol having from 12 to 24 carbons to presently employed additives for white batter whip cakes and sponge cakes has enabled using such mixtures of the invention successfully in such cakes. Such application of the fatty alcohol-enhanced emulsification mixtures of the invention are illustrated by, but not limited to, the following examples:

EXAMPLE 6.—CAKE MAKING FORMULAE AND BAKING PROCEDURES USED IN THIS CAKE APPLICATION OF THE MIXTURES OF THE INVENTION ARE AS FOLLOWS

WHITE AND YELLOW BATTER WHIP CAKES FORMULATION

[Total absorption-101.2%; Dry ingredients-834.6 gms.]

| Ingredients | Baker's percent | White grams | Yellow grams | 6 cake dry mixes made in P.K.. |
|---|---|---|---|---|
| Cake flour turbo | 100.0 | 364.0 | 364.0 | 2.19 kg[1] |
| Granulated sugar | 110.0 | 400.0 | 400.0 | 2.40 kg. |
| Fleischmanns baking powder | 6.0 | 21.8 | 21.8 | 130.8 gms. |
| Granulated salt | 3.0 | 10.9 | 10.9 | 65.4 gms. |
| Powdered milk | 10.0 | 16.4 | 16.4 | 218.4 gms. |
| Corn syrup (optional ingredient) | 4.0 | 14.6 | 14.6 | |
| Frozen egg whites | 35.0 | 127.4 | | |
| | 13.0 | | 47.3 | |
| Frozen whole eggs | 8.0 | 29.1 | | |
| | 30.0 | | 109.2 | |
| Water | 60.0 | 218.4 | 218.4 | |
| Dry vanilla concentrate | 0.4 | 1.5 | 1.5 | 9.0 gms. |
| Water | 41.2 | 150.0 | 150.0 | |

[1] P.K. is the Patterson-Kelley Co. Inc. V-shaped intercommunicating twin shell mixer.

Batter preparation and baking procedure

*First stage.*—The dry ingredients, emulsifier, and 218.4 cc. (that is, cubic centimeters) of water are placed in the bowl and mixed for 15 seconds at first speed in a C-100 Hobart mixer with wire whip; and mixing is continued for 1 minute and 45 seconds at second speed.

*Second stage.*—Add all of the eggs over a 1 minute period at first speed, scrape down and continue mixing for 4 minutes at third speed.

*Third stage.*—The balance of the water, 150 cc., is added over a 1 minute period at first speed, and then the bowl is scraped down. Mixing is continued for 3 additional minutes at first speed. Batter (368.4 gms.) is scaled into 8-inch round pans and baked at 375° F. for 24 minutes. Batter temperature should be 68–72° F. Baked cake is allowed to cool 45 minutes prior to measuring volume by rape seed displacement and cutting for quality scoring.

FIRST

| Ingredients | Baker's percent | Grams |
| --- | --- | --- |
| Turbo cake flour | 100 | 405.4 |
| Nulomoline | 7.82 | 31.7 |
| Granulated sugar | 116.4 | 472.0 |
| Powdered milk | 4.86 | 19.7 |
| Salt | 2.91 | 11.8 |
| Baking powder | 5.85 | 23.7 |
| Yellow food color | .49 | 2.0 |
| Vanilla (dilute) | .99 | 4.0 |
| Water | 48.54 | 196.8 |

Emulsifier is varied in test bakes. Percent is adjusted accordingly.

All of the above ingredients are mixed in a C-100 Hobart mixer with a 3 quart bowl and wire whip is used for 30 seconds at low speed, and then 2 minutes at third speed.

SECOND

| Ingredients | Baker's percent | Grams |
| --- | --- | --- |
| Whole eggs | 48.2 | 236.0 |

Mix in the eggs in 30 seconds at low speed, scrape bowl and mix 4 minutes at second speed.

THIRD

| Ingredients | Baker's percent | Grams |
| --- | --- | --- |
| Water | 46.60 | 188.8 |

Mix in the water over 1 minute at low speed, scrape and mix 2 minutes at second speed. Batter temperatures 68° to 72° F.

Batter (368 gms.) is scaled into 8-inch round pans and baked at 375° F. for 30 minutes.

Standard cake quality evaluation

The quality of the cakes baked in accordance with the foregoing procedures and recipes were evaluated using a modification of the system employed by the American Institute of Baking. Routine evaluation ratings are as follows:

| Factor: | Relative value |
| --- | --- |
| Symmetry | 4 |
| Bake [1] | 8 |
| Volume [2] | 10 |
| Color of crumb | 5 |
| Grain | 5 |
| Texture | 10 |
| Flavor and aroma | 10 |
| Eating quality | 8 |
| Icing and filling [3] | 40 |
| Total quality | 100 |

[1] The term "bake" refers to the overall external appearance of the uniced cake.
[2] "Volume" is evaluated according to the following table:

| Cc.: | |
| --- | --- |
| 1200–1300 | 10 |
| 1100–1200 | 9 |
| 1000–1100 | 8 |
| 900–1000 | 7 |
| 800–900 | 6 |
| 700–800 | 5 |
| 600–700 | 4 |
| 500–600 | 3 |
| 400–500 | 2 |
| 300–400 | 1 |
| Less than 300 | 0 |

[3] When uniced and unfilled cakes are scored, a value of 40 is arbitrarily assigned to this factor.

Fatty alcohols admixed in mixtures of lactylic stearate, monoglycerides, and sorbitan ester Studies carried out during the past several years resulted in the development of a patented mixture of esters in a hydrogenated vegetable oil base, which now is employed commercially as an emulsifier for improving the quality of chemically-leavened baked goods. Its formula is as follows

| Ingredient: | Percent |
| --- | --- |
| Lactylic stearate | 26.0 |
| Distilled 90% monoglyceride | 18.5 |
| Polyoxyethylene(20) sorbitan monostearate | 6.5 |
| 45% monoglyceride | 23.0 |
| Hydrogenated vegetable oils | 26.0 |

This example compares the respective effects of (a) using this oil based mixture of esters alone as the emulsifier added to the cake ingredients, with (b) admixing a different fatty alcohol from those having from 12 to 24 carbons separately respectively with separate quantities of this oil based emulsifier (mixture of esters), and adding each such resulting fatty alcohol and mixed esters emulsifier mixture to a respectively separate batch of the same cake ingredients, making the cakes and evaluating them. The results which were obtained, included those from using the fatty alcohol as the only emulsifier, as well as those from a control bake made without any emulsifier, are:

White Whip Cakes Made from Oil-Based Emulsifiers, and from Their Admixture With Fatty Alcohols

| | Fatty alcohol | | | | | | | | |
| --- | --- | --- | --- | --- | --- | --- | --- | --- | --- |
| | None | None | $C_{14}$ | $C_{16}$ | $C_{18}$ | $C_{20}$ | $C_{16}$ | $C_{16}$ | $C_{16}$ |
| Fatty alcohol level (percent) | | | 0.13 | 0.13 | 0.13 | 0.13 | 0.13 | 0.28 | 0.13 |
| Oil-based emulsfier level percent | None | 2.00 | 1.80 | 1.80 | 1.80 | 1.80 | 2.00 | 1.70 | |
| Batter temp. (° F.) | 70 | 68 | 69 | 68 | 68 | 68 | 69 | 69 | 69 |
| Batter specific gravity | 1.03 | 0.74 | 0.69 | 0.66 | 0.72 | 0.74 | 0.69 | 0.76 | 1.04 |
| Cake volume (in cc.) | 910 | 1,145 | 1,190 | 1,240 | 1,205 | 1,215 | 1,140 | 1,135 | 880 |
| Total score | 77.5 | 88.5 | 91.0 | 93.0 | 93.0 | 91.5 | 91.5 | 91.5 | 82.8 |

The foregoing white whip cake evaluations show that in all 6 of them wherein the oil-based mixed esters emulsifier was used admixed with one of the involved fatty alcohols (thereby using fatty alcohol-enhanced emulsification mixtures of the invention), the total scores running from a low of 91.0 to a high of 93.0 far exceeded the 88.5 total score found for the cakes made with 2.0% (baker's) of the oil-based (mixed esters) emulsifier alone as the only emulsifier additive. Against that, in 5 of the 6 evaluated whip cakes made with an emulsifier composition of the invention, the total of the fatty alcohol and oil-based mixed esters was only 1.93%. That is lower than the content of the oil-based emulsifier when used alone.

Similar and even more strikingly improved results are seen from the following illustrative, but not restricting, examples of use of mixtures of a fatty alcohol and an ester compared with cakes obtained using the fatty alcohols alone as well as using the ester alone:

EXAMPLE 7.—CETYL ALCOHOL AND STEARYL ALCOHOL SEPARATELY WITH LACTYLIC STEARATE (i) 3 batches of white whip cakes were prepared using as emulsifier of the invention cetyl alcohol admixed with lactylic stearate. Also prepared were 2 batches using as emulsifier lactylic stearate alone and in amounts equal to and exceeding the total of that stearate and the cetyl alcohol in these first 3 batches. A third batch using lactylic stearate alone and 2 batches using the cetyl alcohol alone as emulsifier also were made, to a total of 8 batches in all. The evaluation data and results are:

It is seen that using the stearyl alcohol with lactylic stearate as an emulsifier mixture of the invention provided a total score of 93.5 and a cake volume of 1350 cc. Both are strikingly higher than the 89.4 total score and 1250 cc. cake volume for the sponge cake made using the higher level 1.13% of lactylic stearate alone.

For each of the last two foregoing evaluations, a plastic dispersion of the fatty alcohol, namely, the cetyl alcohol and stearyl alcohol respectively, in the lactylic stearate was prepared by melting the two ingredients together, stirring and allowing the dispersion to cool separately to a solid mass. This thereafter was ground before use.

EXAMPLE 8.—STEARYL FUMARIC ACID AND POLYOXYETHYLENE(20) SORBITAN MONOSTEARATE WITH AND WITHOUT CETYL ALCOHOL COMPARED (A) IN WHITE WHIP CAKES

Each of stearyl fumaric acid and polyoxyethylene(20) sorbitan monostearate alone or jointly is inadequate as an emulsifying improver for chemically leavened baked goods, such as white whip cakes. However, adding a comparatively small quantity of a fatty alcohol of 12 to 24 carbons according to the invention, provides their mixture with unexpectedly high improvement in such baked goods.

Such fatty alcohol-enhanced emulsification mixture of the invention was prepared, for example, by melting together cetyl alcohol, stearyl fumaric acid, polyoxyethylene (20) sorbitan monostearate, with an amount of water sufficient to dissolve the monostearate and, upon whipping together these constituents and allowing them thus then to cool and in the form of a homogeneous disper- (i) Lactylic Stearate Plus Cetyl Alcohol ($C_{16}$) Mixtures in White Whip Cakes

| | | | | | | | | |
|---|---|---|---|---|---|---|---|---|
| Cetyl alcohol level (percent) | None | 0.13 | 0.20 | 0.13 | 0.13 | 0.20 | None | None |
| Lactylic stearate level (percent) | 1.00 | None | None | 1.00 | 1.25 | 1.00 | 1.13 | 1.40 |
| Batter temp. (° F.) | 70 | 67 | 67 | 71 | 70 | 71 | 67 | 68 |
| Batter specific gravity | 0.83 | 1.04 | 1.04 | 0.70 | 0.70 | 0.70 | 0.93 | 0.92 |
| Cake volume (cc.) | 1,075 | 920 | 980 | 1,130 | 1,120 | 1,180 | 1,020 | 1,035 |
| Total score | 89.5 | 79.5 | 82.0 | 91.5 | 92.0 | 93.0 | 88.7 | 89.4 |

These results show the strikingly unexpected improvement by using the mixtures containing the cetyl alcohol which provided cake volumes of 1120, 1130 and 1180 for their 3 cake batches as compared with only 1075 for the highest of the 3 batches made with use of lactylic stearate alone. Similarly, the cakes made with the cetyl alcohol-enhanced mixture showed total scores of 91.5, 92.0 and 93.0 markedly higher than 89.5 as the highest total score of the 3 batches for which lactylic stearate alone was the emulsifier.

(ii) Then 4 sponge cake batches were prepared, in one of which was used an emulsifier mixture of the invention having 0.13 baker's percent of stearyl alcohol plus 1.0% of lactylic stearate. In each of 2 others lactylic stearate alone was used as emulsifier (one at 1.0% level and the other at 1.13%), and no emulsifier was used in the fourth batch serving as a control. They showed the following evaluations:

(ii) Lactylic Stearate Plus Stearyl Alcohol ($C_{18}$) In Sponge Cakes

| | | | | |
|---|---|---|---|---|
| Stearyl alcohol ($C_{18}$) level (percent) | None | None | 0.33 | None |
| Lactylic stearate level (percent) | None | 1.00 | 1.00 | 1.13 |
| Batter temp. (° F.) | 68 | 69 | 70 | 68 |
| Batter specific gravity | 0.86 | 0.90 | 0.74 | 0.84 |
| Cake volume (cc.) | 1,150 | 1,165 | 1,350 | 1,215 |
| Total score | 89.0 | 88.0 | 93.5 | 89.4 | sion. White whip cakes prepared by the earlier above disclosed recipe and procedure, using their mixture in 3 batches, and separately using stearyl fumaric acid alone in another batch, and also separately using a mixture of it and the polyoxyethylene(20) sorbitan monostearate in 2 other batches resulted in the following data and evaluations:

(a) Cetyl ($C_{16}$) Alcohol, Stearyl Fumaric Acid And Polyoxyethylene (20) Sorbitan Monostearate Mixtures In White Whip Cakes

| | | | | | | |
|---|---|---|---|---|---|---|
| Cetyl alcohol level (percent) | None | None | 0.13 | None | 0.13 | 0.20 |
| Stearyl fumaric acid level (percent) | 2.5 | 1.00 | 1.00 | 1.00 | 1.00 | 1.00 |
| Polyoxyethylene (20) sorbitan monostearate level (percent) | None | 0.20 | 0.20 | 0.30 | 0.30 | 0.20 |
| Water level (percent) | 4.12 | 4.12 | 4.12 | 4.12 | 4.12 | 4.12 |
| Batter temp. (° F.) | 67 | 68 | 72 | 67 | 71 | 72 |
| Batter specific gravity | 1.06 | 1.02 | 0.70 | 1.02 | 0.73 | 0.77 |
| Cake volume (cc.) | 985 | 940 | 1,250 | 930 | 1,145 | 1,140 |
| Total score | 81.0 | 85.0 | 93.0 | 84.8 | 90.4 | 90.4 |

(b) Same 2 esters with and without cetyl alcohol compared in sponge cakes

Stearyl fumaric acid and polyoxyethylene(20) sorbitan monostearate mixtures prepared with and without cetyl alcohol as in part (a) were used similarly in sponge cakes, and gave the following comparison:

(b) Stearyl Fumaric Acid And Polyoxyethylene (20) Sorbitan Monostearate With And Without Cetyl Alcohol Compared in Sponge Cakes

| | | |
|---|---|---|
| Cetyl alcohol level (percent) | 0.13 | None |
| Stearyl fumaric acid level | 1.00 | 1.00 |
| Polyoxyethylene (20) sorbitan monostearate level (percent) | 0.20 | 0.20 |
| Water level (percent) | 4.12 | 4.12 |
| Batter temperature (° F.) | 68 | 66 |
| Batter specific gravity | 0.74 | 0.83 |
| Cake volume (cc.) | 1,315 | 1,195 |
| Total score | 93.0 | 88.9 |

In preparing the earlier above described laboratory baked breads the fatty alcohol-enhanced emulsifying agents used were added to the sponge as discrete particles (except that lauryl alcohol was added as liquid), which then was mixed for 7 minutes. In the commercial continuous-mix bread making of Example 5, all of the respective emulsifiers were added in the form of a fat dispersion to the shortening.

The fatty alcohol-enhanced emulsification mixtures or compositions of the invention, as stated earlier, can be provided in the hydrated form and also as non-hydrated compositions. By hydrated form is intended a dispersion of the mixed emulsifier additives containing the fatty acid ingredient (1) together with any of the ester ingredients (2)(a), (b), and/or (c) in water to the extent of from about 45 to 85% of the dispersion, beneficially from about 65% to 80% of water, to form a generally homogeneous dispersion.

The hydrated form sometimes referred to as a water-based emulsifier, is illustrated, but not limited to, admixture of a fatty alcohol with a monoglyceride ester ingredient. Thus, the selected monoglyceride (which, for example, can be any from a 40% alpha-monoglyceride to a 90% distilled monoglyceride), and a suitable portion of the water, conveniently from about 35% to 65% of it, and a suitable mold inhibitor such as sodium propionate, are melted together at an effective temperature and held at 140° to 160° F.

The selected fatty alcohol then is admixed into the melt which then is admixed with the rest of the water (hot), for example, by use of dual piston metering pumps. The homogeneous mixture is completed by passing the admixture dispersion through a high speed mixing device or homogenizer. The resulting homogeneous dispersion then is cooled rapidly, as in a scraped surface heat exchanger, and then drummed as the finished product.

Alternatively, all of the ingredients (including all of the water) are heated and then agitated in the melting vessel to a temperature above the melting point of the ester ingredient, for example, the monodiglyceride, and held at that temperature to uniformity by continuous stirring. Thereafter the dispersion is pumped through the scraped surface heat exchanger to be cooled and then through a unit or device to mechanically work and agitate the dispersion, from which it is drummed. The filled drums then are set aside in the tempering chamber for a time sufficient for the dispersion to take on its proper crystalographic character.

Typical hydrated emulsifier formulations are illustrated by, but not restricted to, the following:

EXAMPLE 9.—HYDRATED MONOGLYCERIDE-CONTAINING DISPERSIONS

Various such hydrated or water-based monoglyceride-containing emulsifiers conveniently can contain by weight from about 5.0 to about 0.5 percent stearyl alcohol, cetyl alcohol, lauryl alcohol, or myristyl alcohol (or any of the others embraced within the emulsifier products of the invention), and 0.4 percent of a mold inhibitor (typically sodium propionate and an acidulant such as a physiologically acceptable lower fatty acid as acetic acid, or propionic acid, or a hydroxy-substituted lower aliphatic carboxylic acid as lactic acid); both the alcohol and inhibitor being dispersed in any of the following respective quantities of ester ingredient and water:

(i)

20.0% of distilled glyceryl monostearate (90% alpha-monoglyceride), and (ii)

74.6 to 79.1% of water.
35.0% mono-diglyceride (50% alpha-monoglyceride), and
59.6 to 64.1 of water.

(iii)

25.0% mono-diglyceride (50% alpha-monoglyceride),
25.0% propylene glycol monostearate (65% monoester), and
44.6 to 49.1 of water.

EXAMPLE 10.—HYDRATED DISPERSIONS WITH MORE THAN ONE ESTER

The hydrated form of the fatty alcohol-enhanced emulsifiers may contain two or more diesters as exemplified in the following (wherein parts are by weight):

(iv)

12.0 parts mono-diglyceride (50% alpha-monoglyceride),
12.0 lactylic stearate,
0.4 mold inhibitor,
75.5 to 70.6 water, and
0.1 to 5.0 fatty alcohol (as in Example 9).

(v)

15.0 parts distilled monoglyceride,
10.0 acetylated tartaric acid ester of mono- and/or mono- and diglycerides,
5.0 partially hydrated shortening,
0.1 to 5.0 fatty alcohol (as in Example 9),
0.4 mold inhibitor, and
69.5 to 64.6 water.

(vi)

20.0% sorbitan monostearate,
5.0 polyoxylethylene(20) sorbitan monostearate,
0.1 to 5.0 fatty alcohol (as in Example 9),
0.4 mold inhibitor,
20.0 distilled monoglyceride, and
54.5 to 49.6 water.

The non-hydrated form of the fatty alcohol-enhanced emulsifier mixtures of the invention are illustrated by, but not limited to, the dry emulsifier mixtures, and the oleaginous type. The latter can be of the so-called oil-based type wherein the fatty alcohol constituent and one or more of the ester constituents is or are dispersed in one or more hydrogenated vegetable or animal oils, or of the shortening type wherein the fatty alcohol is dispersed in a shortening.

The oil-based type merely is illustrated by the "resulting fatty alcohol and mixed esters emulsifier mixture" as referred to at Col. 12, lines 51–56 by mixing the desired one or more of the fatty alcohols of from 12 to 24 carbons with the oil-based emulsifier described at lines 41–47 of Col. 12.

The dry form of fatty alcohol-enhanced emulsifier mixtures of the invention are prepared by one of three different methods. The finely divided ester ingredient, of suitable or convenient mesh, can be admixed with any one or more of its same type or any of one type can be mixed with any one or more of any of the other two types. Then a single ester ingredient or mixture (of esters) ingredient in finely divided form merely is admixed with the desired amount for the proportion wanted of the similarly finely divided (e.g. 100 to 200 mesh) fatty alcohol (other than lauryl alcohol) to give the finely divided final dry mix emulsifier, as illustrated by:

EXAMPLE 11.—FATTY ALCOHOL ADMIXED WITH DIFFERENT ESTER INGREDIENT RESPECTIVELY

From about 1 to about 10 parts by weight of the selected fatty alcohol (of from 100 to 200 mesh), for example, stearyl, cetyl, and/or myristyl alcohol (or any other fatty alcohol of 14 to 24 carbons) is admixed homogeneously with from about 99 to about 90 parts by weight of the following separately respective ester ingredients, in each case to provide the corresponding final finely divided dry mix fatty alcohol-enhanced emulsifier of the invention:

(a) Finely divided (60 to 200 mesh) sodium stearyl fumate. Another such dry mix is obtained similarly by replacing this fumarate by the same range to stearyl fumaric acid.

(b) Finely divided (40 to 200 mesh) succinylated (having a free carboxyl group linked to the succinyl moiety) monoglyceride.

(c) Finely divided (80 to 200 mesh) of distilled monoglyceride.

(d) Finely divided (40 to 200 mesh) lactylic stearate; and similarly another such dry mix by using the same quantity range and same mesh of calcium stearyl lactylate admixed with the selected fatty alcohol.

In any of the foregoing examples (a) through (d), when lauryl alcohol is used as the fatty alcohol, because of the so much smaller amount of the fatty alcohol compared to the finely divided solid ester ingredient, the lauryl alcohol may be added as liquid to the agitated finely divided ester to be uniformly admixed with its solid particles, generally to yield a final mixture product likewise in finely divided form.

Any of the foregoing dry fatty alcohol-enhanced emulsifier mixtures advantageously is prepared by adding the selected fatty alcohol (and in this procedure lauryl alcohol can be used and added in its liquid state) to a melt of the selected ester ingredient, agitating the mixture to uniformity, and then either beading the resulting mixture, for example, by allowing it to cool as it drops through a beading tower, or otherwise cooling it to a solid and grinding the solid mix.

Incidentally, this type of dry emulsifier mixture containing the selected fatty acid and this particular type of ester, as in parts (a) and (d) just above, can be made as a direct product of the esterification of fumaric acid with the selected fatty alcohol, by including in the starting esterification mixture a sufficient excess of the selected fatty alcohol, in this case stearyl alcohol, to leave the remaining admixed with the final ester product sodium stearyl fumarate or stearyl fumaric acid as the desired amount of the stearyl alcohol.

This alternate method of making these mixtures (a) and (d) above illustrates the third method for making the dry form of fatty alcohol-enhanced emulsifier mixtures.

EXAMPLE 12.—NON-HYDRATED FORM FATTY ALCOHOL-ENHANCED EMULSIFIER HAVING FATTY ALCOHOL DISPERSED IN SHORTENING

The inclusion of any applicable fatty alcohol or alcohols in a shortening composition containing one or more of the applicable ester ingredients can be done easily because the fatty alcohol ingredient readily is dispersible in the shortening compositions in their melt stage.

An illustrative, but not to be limiting, example is a partially hydrogenated animal or vegetable triglyceride having admixed in it (i) from about 5 to about 20% of any one or more of any of the three types of ester constituents such as a monoglyceride (as any of those already described earlier above), and (ii) from about 0.01 to 2.0% of any herein noted as applicable fatty alcohol (as stearyl, cetyl, myristyl, or lauryl alcohol), each of (i) and (ii) being by weight based on the weight of shortening.

Any other such shortening type of fatty-alcohol emulsifier composition of the invention can be prepared by similarly admixing any other fatty alcohol or any other selected ester or mixture of esters of any of the disclosed type or types of ester ingredient.

Among the fatty alcohol-enhanced emulsifier mixture compositions of the invention are cake mixes which include, for example, the foregoing non-hydrated form of composition of the invention wherein the fatty alcohol and ester ingredients are incorporated in a shortening. These are illustrated by, but not to be restricted to, the following:

EXAMPLE 13.—YELLOW LAYER CAKE MIX

This cake mix contains a free flowing mixture of the following ingredients, whose respective contents are given in baker's percent.

| Ingredient: | Baker's percent |
|---|---|
| Cake flour | 100.0 |
| Salt | 3.0 |
| Baking powder | 6.0 |
| Granulated sugar | 120.0 |
| Non-fat dry milk | 12.5 |
| Vanilla (dry) | 0.4 |
| Shortening and admixed emulsifier | 42.1 |

This shortening with admixed emulsifier is of the type described in Example 12 and is composed in baker's percent of 40.0 of shortening and 2.1 of the fatty alcohol-enhanced emulsifier mixture such as that of Example 11 (d). This specific emulsifier, of course, can be replaced by an equivalent amount of any of the other emulsifier mixtures disclosed herein.

The shortening and the emulsifier admixture with it are prepared separately and then uniformly admixed, for example, as in Example 12; and then the resulting mixture while still in the melt stage is sprayed to provide the shortening with admixed emulsifier in finely divided form. In that form this shortening with admixed emulsifier is mixed into a mixture of all of the other ingredients from the cake flour to the vanilla, or alternatively merely is added to them before they are mixed, to be mixed with them as in a C–100 Hobart mixing bowl.

The final mixture then is packaged. The packages can carry instructions to require the user to add to the mix an amount of whole egg which is calculated as being the equivalent of 50.0 baker's percent of whole eggs with respect to the foregoing recipe, and also the equivalent in braker's percent of 110.0 of water. Alternatively, the equivalent thereof in powdered dried whole eggs can be included with the other ingredients in making up the cake mix. The package instructions will include also a requirement to bake for 27 to 29 minutes in a 375° F. oven.

EXAMPLE 14.—WHITE BATTER (NON-FAT) WHIP CAKE MIX

This mix contains the following ingredients in their below respectively recited content in baker's percent.

| Ingredient: | Baker's percent |
|---|---|
| Cake flour | 100.0 |
| Granulated sugar | 110.0 |
| Non-fat dry milk | 10.0 |
| Baking powder | 6.0 |
| Salt | 3.0 |
| Vanilla (dry) | 0.4 |
| Fatty alcohol-enhanced emulsifier | 6.2 |
| Dried egg whites | 4.4 |
| Dried whole eggs | 2.62 |

The fatty alcohol-enhanced emulsifier can be any of those earlier above described as prepared as a dry mix. The various ingredients are charged into the mixer in finely divided form and mixed until uniform, and then packaged.

The package instructions will include a requirement to add that amount of water which is equivalent to the inclusion of 174.5 baker's percent with the total of all of the ingredients, 71.5% (baker's) of the water considered as that required to reconstitute the dried egg whites and dried whole eggs. The instructions will require adding the water to the dry mix and blending them together by mixing with a wire whip mixer for a sufficient period between 5 and 10 minutes. The instructions then will tell to place the resulting batter into a greased pan and to bake for 25 to 29 minutes at 375° F.

EXAMPLE 15—JELLY ROLL CAKE MIX

This cake mix is prepared by mixing the following ingredients in finely divided form in their below respective quantities in baker's percent.

| Ingredient: | Baker's percent |
| --- | --- |
| Cake flour | 100.0 |
| "Nulomoline" invert sugar | 7.8 |
| Granulated sugar | 116.4 |
| Non-fat dry milk | 4.9 |
| Salt | 2.9 |
| Baking powder | 5.8 |
| Vanilla (dry) | 0.4 |
| Emulsifier | 1.5 |
| Dried whole eggs | 4.8 |

The emulsfier can be any of the finely divided dry form of the fatty alcohol-enhanced emulsifier mixtures as described elsewhere herein. After the ingredients are uniformly mixed, the mixture then is packaged. The package instructions will require blending in with its contents an amount of water equivalent to 99.9% (baker's) of water within a period of from 5 to about 8 minutes using a wire whip mixer, and that thereafter the batter is to be baked for 8 to 10 minutes at 400° F.

While Example 1 describes use of five different individual fatty alcohols separately respectively, and other examples show use of merely one or two of them, any said fatty alcohol can be replaced in any of the examples or in any herein described modifications of any of them, by an equivalently effective amount of any other of the earlier above described applicable fatty alcohols having 12 to 24 carbons, and so far as presently indicated, especially lauryl alcohol, cetyl alcohol, stearyl alcohol, and myristyl alcohol, and within the earlier above disclosed range and proportions for addition to the esters.

The upper level of any of these applicable alcohols that can be used generally is self-limiting in that levels above about 0.50% (baker's) can impart undesirable flavor and order particularly to cakes. No such effect occurred at the levels of use of the various alcohols in the foregoing examples.

Similarly, while some of the examples show use of a fatty alcohol of the type involved in the invention along with only one or two of the various ester ingredients (a), (b) and (c) separately respectively, any other of each of the three different types of ester ingredient, or mixture of any of each of the types or of any two of them or of all three of them, as well as of the free acid or disclosed form of any ester ingredient having a free carboxyl group, can be used similarly within the ranges disclosed for them.

All of the various specific examples provided by these different foregoing substitutions for either or both of the fatty alcohol and any of the three types of ester ingredient are presented as if appearing in fully written out form herein for actually to do so would extend unduly the already lengthy disclosure.

The various fatty-alcohol-enhanced emulsifier mixtures of the invention can be used in any of the baked carbohydrate food products in their respectively indicated forms, either hydrate or dry mix, in preparing icings, and fillings, and creams (as for cream layers) and other uses in cakes. In addition, such dry mix and/or hydrated forms of the fatty alcohol-enhanced emulsifiers can be used in other carbohydrate comestibles such as candy fillings and foudants, and in the dry mix form can be used in powder mixes for puddings such as chocolate and corn starch puddings, and fillings for pies.

The expression "physiologically tolerable" used, for example, to describe applicable salts of some of the esters having a free carboxyl group, means that the cation is such that it does not provoke any toxic effect on the user of the product wherein the ester salt made by the cation is an ingredient, in the concentration of the cation in the product (by its content of such salt) and at the regimen (rate or frequency) of its use whether it is consumed by oral ingestion as by being eaten, or as in the case of a topical pharmaceutical or cosmetic lotion, ointment or pomade, by application to any part of a mucous membrane or of the skin, and through which it could be absorbed into the system.

The expression "carbohydrate comestibles" is used to cover broadly prepared carbohydrate-based food or edible products, such as carbohydrate-based bakery products embracing baked carbohydrate food products as well as fillings and icings for cakes, and also desserts such as puddings, confections, and ice-creams.

The expression "baked carbohydrate food products" intends the products of the type covered in those of the earlier above examples which illustrate bread, cakes, and cake mixes, and includes also fillings and creams and icings for cakes, and also pies, as well as rolls.

Such products also can be considered as flour-based or flour-derived products or also as baked flour-based or flour-derived food products. Such designations thus distinguish these bakery type of products from confections such as candy fillings, fondants, and desserts such as puddings, or ice creams, the preparation of which also includes emulsification compositions of this invention.

The two different emulsification compositions of the invention and the three individual emulsifying agents, with which they were compared in Example 5, respectively separately were added as a fat dispersion to the shortening. Those two compositions and any of the various emulsification compositions of this invention may be added to any shortening formulations, for example, those described in Bruce D. Buddemyer et al. Pat. 3,360,375 (its col. 4 line 36 to the end).

These emulsifying compositions can be added to the shortenings in known manner as described in that same column of that patent or other suitable way, advantageously to provide new shortenings containing a functionally effective amount of an emulsification composition of the invention, for example, to the extent by weight based on that of the shortening for it to have (i) from about 0.01 to about 2% of the fatty alcohol constituent and (ii) from about 5 to about 20% of the ester constituent of this additive.

Thus, any specific formulation of emulsification composition of the invention used in any of the earlier above examples, or any of the described possible variations of these compositions, can be incorporated similarly in any suitable shortenings to provide as another part of this invention new shortening formulations containing a functionally sufficient amount of any of the emulsification compositions of the invention. Such new shortening formulations thus are deemed to be presented as if written out extensively in full herein.

By "functionally effective" or "functionally sufficient" is intended an amount of the emulsifying or emulsification composition of the invention which is adequate to provide at least in part the enhanced improvement in some one or more of the scoring or quality characteristics of, for example, a baked carbohydrate food product being prepared from the materials into which the emulsification composition was incorporated. Simple readily handled laboratory baking tests can be run for that purpose.

The acyl lactylic acids and their salts which are type (a) of the three types of esters which can be the ester constituent of the emulsification mixture compositions of the inventions can be prepared, for example, by methods described in the Bruce D. Buddemeyer et al. Pats. Nos. 2,733,252 and 2,789,992. For the ammonium salt instead of using ammonium hydroxide in the method of the latter of those two patents, ammonium carbonate can be used in the method of the earlier one of them.

Similarly also, any other salts such as those of the trace metals described earlier above herein and not disclosed in either of those two patents can be prepared by using the respective carbonate of any of them in the method of Pat. 2,733,252 or the carbonate or some suitable other salt of them by the method of Pat. 2,789,992.

The fatty alcohol monoesters of aliphatic dicarboxylic acids and/or salts thereof, for example, stearyl succinic acid, stearyl fumaric acid, sodium stearyl succinate, and sodium stearyl fumarate, which are type (b) of the ester constituent of the compositions of the invention, are prepared as shown in the Bruce D. Buddemeyer et al. U.S. Pat. No. 3,360,375.

While the invention has been explained by detailed description of certain specific embodiments of it, it is understood that various modifications and/or substitutions can be made in any of them within the scope of the different appended claims which are intended also to cover equivalents of any of the various embodiments.

What is claimed is:

1. A flour mix for preparing a baked flour product, which mix comprises flour for said baked product and intimately admixed in said flour in an amount, effective to enhance at least some one of the characteristics and quality of said baked product, of an emulsification composition comprising as its essential co-acting emulsifying constituents:
   (i) at least one fatty alcohol having from about 12 to about 24 carbon atoms, and
   (ii) an aliphatic ester constituent member of the class consisting of
      (a) an acyl lactylic acid type ester having the formula $RCO \cdot (OCH \cdot CH_3 \cdot CO)_n OZ$, wherein RCO is the acyl radical of any of the fatty acids having from about 12 to about 24 carbon atoms, Z is a physiologically tolerable cation, and $n$ is the average number of lactyl groups per molecule and ranges from 0.1 to about 10;
      (b) a fatty alcohol mono-ester of an aliphatic dicarboxylic acid and having the formula
         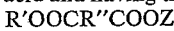
         R'OOCR"COOZ
      wherein R' is the monovalent hydrocarbon radical of a fatty alcohol as in constituent (i), R" is the divalent saturated or unsaturated hydrocarbon radical between the two carboxylic groups of an aliphatic dicarboxylic acid having at most about 10 carbon atoms and which radical has from zero to 2 hydroxyl groups linked to it, and Z is as defined above;
      (c) a member of the class consisting of (C-1) a mon- to di-fatty acid ester of an aliphtaic polyhydric alcohol having at most about 12 carbon atoms and no substituent on its chain other than from 2 to about 6 hydroxyls, and its ester-forming acyl group has from 12 to about 24 carbon atoms, and (C-2) a polyoxyalkylene derivative of said (C-1) esters with from about 5 to about 100 oxyalkylene groups having two to three carbon atoms in the individual alkylene portions, and (C-3) any of the succinylated, lactylated, and acetylated derivatives of said (C-1) esters; and
      (d) mixtures of any of said types of ester constituents; said fatty alcohol constituent (i) being by weight from about one percent of, to about equal to, said ester constituent (ii).

2. A flour mix for preparing a yeast leavened baked product, as claimed in claim 1, wherein also intimately admixed in said flour mix is an amount of yeast sufficient to leaven the baked product, and said emulsification composition is present to the extent to provide in said mix from about 0.01 to about 0.05 baker's percent of the fatty alcohol and from about 0.15 to about 0.75 such percent of said ester constituent.

3. A flour mix as claimed in claim 2, wherein each of the fatty alcohol constituent and R' of the (b) type ester has from about 12 to about 20 carbon atoms and at most only one olefinic bond.

4. A yeast-containing flour mix as claimed in claim 2, wherein said co-acting fatty alcohol and ester constituents of said emulsification formulation were added in its hydrated form.

5. A yeast-containing flour mix as claimed in claim 2, wherein $n$ is from about 0.3 to about 6.

6. A yeast-containing flour mix as claimed in claim 2, wherein Z is a member of the class consisting of hydrogen, sodium, potassium, the ammnonium group, calcium, magnesium, aluminum, and an essential trace metal.

7. A yeast-containing flour mix as claimed in claim 2, wherein said fatty alcohol is, and the radical R' of the (b) type ester is that of, a fatty alcohol member of the class consisting of stearyl alcohol, lauryl alcohol, cetyl alcohol, oleyl alcohol, and myristyl alcohol.

8. A yeast-containing flour mix as claimed in claim 2, wherein R" is the divalent radical linked to the carboxyl groups of any of succinic acid, fumaric acid, glutaric acid, malic acid, adipic acid, azelaic acid, and sebacic acid.

9. A yeast-containing flour mix as claimed in claim 8, wherein the fatty alcohol is stearyl alcohol and Z is selected from hydrogen, sodium, and calcium.

10. A flour mix for preparing a chemically leavened baked flour product as claimed in claim 1, wherein said mix is a cake mix and contains said co-acting constituents of said emulsification composition intimately admixed in said flour along with chemical leavening agent content and some other of the customary cake-making ingredients.

11. A cake mix as claimed in claim 10, wherein each of the fatty alcohol constituent and R' of the (b) type ester has from about 12 to about 20 carbon atoms and at most only one olefinic bond.

12. A cake mix as claimed in claim 10, which mix also contains a shortening.

13. A cake mix as claimed in claim 10, wherein $n$ is from about 0.3 to about 6, said fatty alcohol is, and the radical R' of the (b) type ester is that of, a fatty alcohol member of the class consisting of stearyl alcohol, lauryl alcohol, cetyl alcohol, oleyl alcohol, and myristyl alcohol; and R" is the divalent radical linked to the carboxyl groups of any of succinic acid, fumaric acid, glutaric acid, malic acid, adipic acid, azelaic acid, and sebacic acid.

14. A cake mix as claimed in claim 13, wherein the fatty alcohol is selected from stearyl and cetyl alcohols, and Z is selected from hydrogen, sodium, and calcium.

15. A yeast-leavened bakery product composed of flour having incorporated therein a functionally effective amount of an emulsification composition as employed in claim 1 to the extent to provide in said product from about 0.01 to about 0.05 baker's percent of the fatty alcohol and from about 0.15 to about 0.75 such percent of said ester constituent.

16. A yeast-leavened bakery product as claimed in claim 15, wherein each of the fatty alcohol constituent and R' of the (b) type ester has from about 12 to about 20 carbon atoms and at most only olefinic bond.

17. A yeast-leavened bakery product as claimed in claim 16, wherein Z is a member of the class consisting of hydrogen, sodium, potassium, the ammonium group, calcium, magnesium, aluminum, and an essential trace metal.

18. A yeast-leavened bakery product as claimed in claim 16, wherein $n$ is from about 0.3 to about 6.

19. A yeast-leavened bakery product as claimed in claim 16, wherein said fatty alcohol is, and the radical R' of the (b) type ester is that of, a fatty alcohol member of the class consisting of stearyl alcohol, lauryl alcohol, cetyl alcohol, oleyl alcohol, and myristyl alcohol.

20. A yeast-leavened bakery product as claimed in claim 16, wherein R" is the divalent radical linked to the carboxyl groups of any of succinic acid, fumaric acid, glutaric acid, malic acid, adipic acid, azelaic acid, and sebacic acid.

21. A yeast-leavened bakery product as claimed in claim 16, wherein the fatty alcohol is selected from stearyl and cetyl alcohols, and Z is selected from hydrogen, sodium, and calcium.

References Cited

UNITED STATES PATENTS

| | | | |
|---|---|---|---|
| 2,657,143 | 10/1953 | Kass | 99—91 |
| 3,228,772 | 1/1966 | Buddemeyer et al. | 99—94 |
| 3,360,375 | 12/1967 | Buddemeyer et al. | 99—91 |

RAYMOND N. JONES, Primary Examiner

J. R. HUFFMAN, Assistant Examiner

U.S. Cl. X.R.

99—92, 94, 118 R; 252—356